United States Patent [19]

Nakajima et al.

[11] Patent Number: 4,922,087
[45] Date of Patent: May 1, 1990

[54] IMAGE READER CAPABLE OF CALCULATING THE REAL FOCAL LENGTH OF A PROJECTING LENS

[75] Inventors: Akio Nakajima; Hirofumi Hasegawa, both of Osaka, Japan

[73] Assignee: Minolta Camera Kabushiki Kaisha, Osaka, Japan

[21] Appl. No.: 242,688

[22] Filed: Sep. 9, 1988

[30] Foreign Application Priority Data

Sep. 10, 1987 [JP] Japan ................. 62-227481

[51] Int. Cl.⁵ .................... G01J 1/20; H04N 1/40
[52] U.S. Cl. .................. 250/201.4; 355/56; 358/497
[58] Field of Search ......... 250/201, 578, 234–236; 358/294, 287, 293, 406, 451, 497; 355/55, 56, 243

[56] References Cited

U.S. PATENT DOCUMENTS

| | | | |
|---|---|---|---|
| 4,086,478 | 4/1978 | Okano | 235/466 |
| 4,272,187 | 6/1981 | Birdsall et al. | 250/201 |
| 4,357,596 | 11/1982 | Feilchenfeld | 235/436 |
| 4,384,272 | 5/1983 | Tanaka et al. | 382/50 |
| 4,420,742 | 12/1983 | Tadauchi et al. | 382/50 |
| 4,464,681 | 8/1984 | Jacobs et al. | 358/285 |
| 4,471,386 | 9/1984 | Tuhro | 358/280 |
| 4,517,606 | 5/1985 | Yokomizo et al. | 358/280 |
| 4,538,185 | 8/1985 | Wiggins | 358/294 |
| 4,724,330 | 2/1988 | Tuhro | 250/578 |
| 4,728,984 | 3/1988 | Daniele | 355/6 |
| 4,751,376 | 1/1988 | Sugiura et al. | 250/201 |

FOREIGN PATENT DOCUMENTS 58-172061 10/1983 Japan .
58-184160 10/1983 Japan .

Primary Examiner—David C. Nelms
Assistant Examiner—Michael Messinger
Attorney, Agent, or Firm—Burns, Doane, Swecker & Mathis

[57] ABSTRACT

An image reader having a mechanism for varying the reading magnification optically by adjusting relative positions of a projection lens and an image sensor is disclosed. The image reader provides a pattern plate on which black or white patterns are formed for detecting a distance defined between two edges of the patterns wherein the distance is read by the image sensor through the projection lens at a predetermined magnification to determined the real focal distance of the projection lens.

7 Claims, 12 Drawing Sheets

Focus detection pattern

Out of focus state

In focus state (a)

Difference between black and white levels distance b (b)

IMAGE READER CAPABLE OF CALCULATING THE REAL FOCAL LENGTH OF A PROJECTING LENS

BACKGROUND OF THE INVENTION

1. Field of the Invention

The present invention relates to an image reader having an optical means for reading an image of a document at an arbitrary magnification.

2. Description of Related Art

In the image reader as mentioned above, light reflected from a document to be read is focused on an image sensor by a zooming lens.

In such an image reader, the distance (a) defined between a reading position of a document and the zooming lens and the distance (b) defined between the zooming lens and the image sensor are varied so as to maintain the following relation defined by two equations as follows;

$$a = f(1 - 1/L.\beta)$$

$$b = f(1 - \beta/L)$$

wherein
f: focal distance of the zooming lens;
L: magnification for reading;
$\beta$: reduction ratio of the zooming lens upon reading a document.

In order to vary the magnification in the image reader of this type, the zooming lens and the image sensor are positioned at respective positions corresponding to the equal reading magnification with the use of an adjusting mechanism for the magnification and the focusing state. This adjusting function is performed by reading patterns provided for detecting the magnification and the focusing state which are formed on the undersurface of a document scale arranged near the top edge of a document. Namely, the magnification is calculated from a distance x defined between two black patterns and the focusing state is detected from output data obtained by reading a black and white stripe pattern formed between two black patterns.

Thereafter, the zooming lens and the image sensor are positioned at respective positions corresponding to a desired magnification by varying the distances (a) and (b) according to the equations mentioned above.

It is also possible to adjust the magnification starting from respective positions which are calculated corresponding to each given magnification. However, this method is not so actual since it is time consuming because of complicated processing for calculating moving amounts of the zooming lens and the image sensor. In order to vary the magnification at a high accuracy in the image reader of this type, possible aberration from the nominal focal distance of the zooming lens and possible error upon mounting it on a mounting means therefor, especially in the vertical direction, cannot be neglected. Ordinally, the zooming lens has an aberration of order of $\pm 0.5\%$ of the nominal focal distance.

In order to compensate these aberrations, a correction factor $\alpha$ is introduced upon calculating the distances a and b as follows;

$$a = \alpha.f(1 - 1/L\beta)$$

$$b = \alpha.f(1 - \beta/L).$$

This correction factor $\alpha$ is estimated from the real aberration of the focal distance measured from individual zooming lens after mounting it.

However, this method is time-consuming in measuring the aberration of the focal distance f and in estimating the correction factor $\alpha$ and, therefore, the production cost becomes high.

SUMMARY OF THE INVENTION

An essential object of the present invention is to provide an image reader being capable of correcting an aberration from the nominal focal distance of a zooming lens easily.

Another object of the present invention is to provide an image reader being capable of varying the reading magnification at a higher accuracy.

In order to achieve these objects, according to the present invention, there is provided an image reader having a scanning optical means for scanning an image of a document with a slit, an image sensor and a projection lens for projecting the scanned image onto the image sensor wherein the image sensor and the projection lens are moved on the optical axis of the latter relative to each other in order to vary the magnification for projecting the document image onto the image sensor being characterized by a pattern element having two black or white patterns for defining respective edges, said pattern element being arranged near the top portion of a platen glass plate on which a document is to be put, a determining means for determining a real focal distance of said projection lens, said means positioning said scanning optical means so as to project the imge of said patterns on said image sensor and positioning said projection lens and said image sensor at positions corresponding to a predetermined magnification, measuring a distance between two edges of said patterns on the basis of outputs from said image sensor and calculating the real focal distance on the basis of the measured distance, a memory means for storing the real focal distance determined by said determining means and a positioning means for positioning said image sensor and the projection lens at respective positions calculated from the magnification designated for reading the image of a document and the real focal distance read from said memory means.

According to the present invention, the real focal distance of a projection lens (zooming lens) having been mounted is easily calculated from data obtained by measuring the distance defined between two edges of the black or white patterns in the state that the projection lens and the image sensor are positioned at respective positions corresponding to a predetermined magnification.

Accordingly, the magnification is always set with use of the real focal distance of the projection lens at a high accuracy.

BRIEF DESCRIPTION OF DRAWINGS

These and other objects and features of the present invention will become more apparent when the preferred embodiment of the present invention is described in detail with reference of accompanied drawings in that.

DETAILED DESCRIPTION OF THE PREFERRED EMBODIMENT

Figure 1:
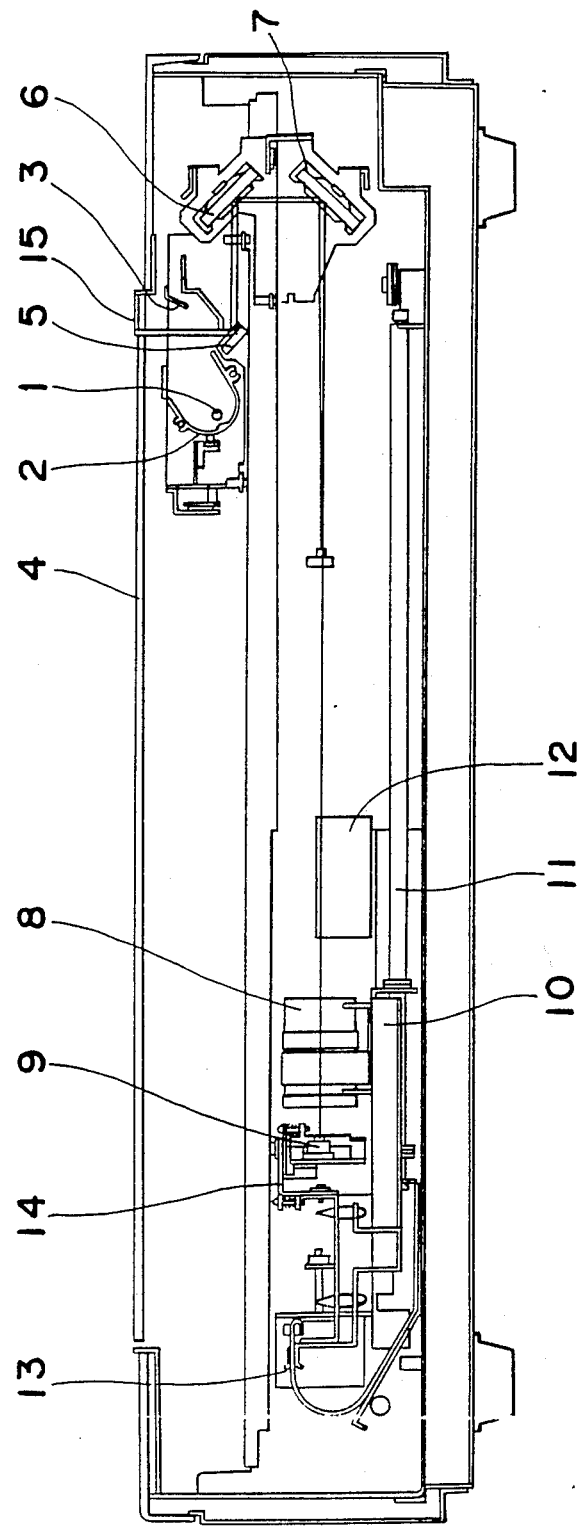
FIG. 1 is a cross-sectional view of an image reader according to the preferred embodiment of the present invention.

The preferred embodiment of the present invention will be explained in the following order;
(a) Mechanism of Image Reader
(b) Internal structure of Image Reader
(c) Focal distance detection mode
(d) Action in the normal mode (a) Mechanism of Image Reader FIG. 1 shows a cross-sectional view along the center line of an image reader including an optical reader for reading a variable magnification.

Light emitted from an illumination lamp 1 is concentrated at a reading position on a glass platen 4 for putting a document by reflecting mirrors 2 and 3.

Reflected light from the document is successively reflected by mirrors 5, 6 and 7 and, thereafter, is focused on a CCD (Charge Coupled Device) array 9 as an image reader by a focusing lens 8.

Upon reading a document, the mirrors 6 and 7 are moved at a speed of one half of the speed of the illumination lamp 1 and the mirror 5 in a sub-scan direction so that an optical light path from a reading position to the focusing lens 8 can be kept constant to maintain the in-focus state of a document image. The image focused on the CCD array 9 is transduced photoelectrically into image data thereby and image data is transmitted to an image processor which will be explained later.

The distance "a" from the reading position to the focusing lens 8 is adjusted by driving a lens motor 12 for moving a holder 10 for the focusing lens 8 along a guide rod 11. The distance "b" defined between the focusing lens 8 and the CCD array 9 is adjusted by driving a focusing motor 13 for moving a holder 14 for the CCD array 9 along the optical axis of the focusing lens 8. The latter holder 14 is mounted on the former holder 10.

(b) Internal structure of Image reader

Figure 2:
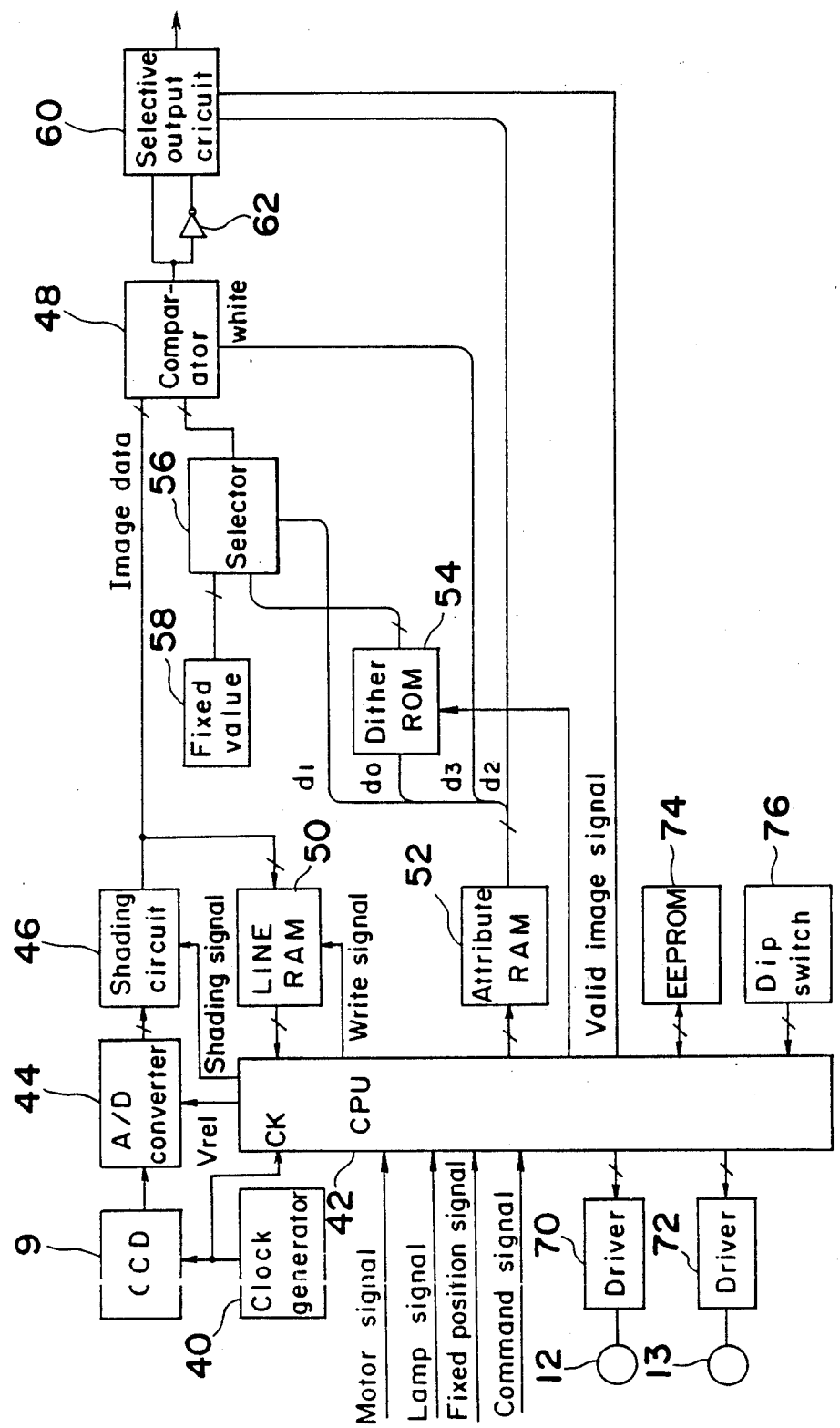
FIG. 2 is a block diagram of an image reading circuit according to the preferred embodiment of the present invention.

FIG. 2 shows a block diagram of a circuit for detecting the density of a document.

A clock generator 40 outputs an SH (sample hold) signal to the CCD array 9 at every reading of one line data and is connected to a CPU 42 (central processing unit) in order to give clock signals thereto. An A/D converter 44 converts analogue signals from the CCD array 9 to digital signals. A shading circuit 46 is provided for correcting possible uneven distribution of the illumination light in the main scanning direction and possible variety of individual CCD chips of the CCD array 9. The CPU 42 controls the shading circuit 46 by outputting timing signals thereto. Output of the shading circuit 46 is input into a comparator 48 and a line RAM 50. The line RAM 50 memorizes data of one scan line being comprised of respective signals corrected by the shading circuit 46. WRITE signals to the line RAM 50 are outputted from the CPU 42 and the latter obtains image information of one scan line by referring to the data memorized in the line RAM 50. Alternatively, all data of a document are read into a memory means with a capacity of storing one page data at first and, image information is outputted by everyline data from the memory means.

The CPU 42 controls the lens motor 12 and the focusing motor 13 via respective drivers 70 and 72 in order to drive them. It is also connected to an EEPROM (Electrically Erasable Programmable Read Only Memory) 74 for memorizing magnifications and receives a signal sent from a dip switch 76 for setting an action mode of the image reader. Further, the CPU 42 controls whole of the image reader by signals mentioned above, a motor signal, a lamp signal, a fixed position signal and command signals.

An attribute RAM 52 memorizes data regarding attributes of respective areas when requested by a command designated from an operation panel (not shown).

A dither ROM 54 generates either one of dither patterns 1 and 2 each comprised of a matrix of m×n threshold values in accordance with the value of attribute information $d_0$. A selector 56 selects either of the dither matrix from the dither ROM 54 and fixed threshold value generated by a generator 58 therefor in accordance with attribute information $d_1$ and send the selected one to the comparator 48. Namely, if the attribute of the present area is designated to the dither, the selector 56 sends data of the dither ROM 54 to the comparator 48, and sends the fixed threshold information of the generator 58 to the comparator 48 if the attribute is designated to the fixed threshold value. The comparator 48 compares image data with respective threshold values selected by the selector 56 and sends the result of the comparison to a selective output circuit 60.

If the attribute information $d_3$ is "1", the comparator 48 sends data of white to the selective output circuit 60 irrespective of image data. Further, the data inverted by an inverter 62 is input to the selective output circuit 60. The same selects either of noninverted data according to attribute information $d_2$ sent from the attribute RAM 52 directly and outputs the selected data to a printer (not shown) in synchronous with valid image signals directly sent thereto.

Next, the attributes RAM 52 will be explained.

In the preferred embodiment of the present invention, the whole image area is divided into some small areas in unit of 1×1 mm² and each of attributes suitable for or designated to individual divided areas is memorized in the attribute RAM 52. According to the attribute information, individual images are edited.

Each of attribute data to be written into the attribute RAM 52 is comprised of four bits ($d_3$, $d_2$, $d_1$, $d_0$) and each of bit indicates attribute information as shown in Table 1.

TABLE 1

| | (Attribute Information) |
|---|---|
| | content |
| $d_3$ | white or valid picture element |
| $d_2$ | inverted or non-inverted |
| $d_1$ | fixed value or dither matrix |
| $d_0$ | dither pattern 1 or 2 |

Namely, $d_0$ designates either of the dither patterns 1 and 2, $d_1$ designates either of the fixed value processing and the dither processing, $d_2$ indicates either of the inversion of black to white and vice versa and the non-inversion. The bit of $d_3$ indicates to delete or erase black data to obtain a blank area.

Using these attribute information of four bits as shown in Table 1, the following eight attributes are given as shown in Table 2.

TABLE 2

| Code | Attribute |
|---|---|
| 00xx | all white |
| 01xx | all black |
| 100x | fixed threshold value |
| 1010 | dither pattern 1 |
| 1011 | dither pattern 2 |
| 110x | inversion with fixed binary value |
| 1110 | inversion with dither pattern 1 |
| 1111 | inversion with dither pattern 2 |

*x indicates data to be neglected irrespective to the value thereof.

It becomes possible to edit images in various modes such as masking, trimming, inversion of black to white and vice versa, switching from the fixed threshold value to the half tone processing or vice versa and the like with use of the attribute RAM 52.

Figure 3:
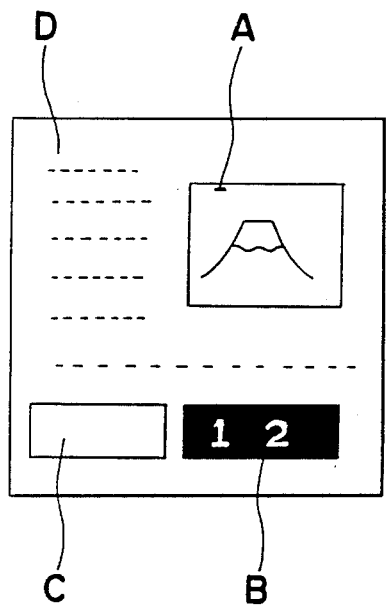
FIG. 3 is an example of a print edited according to designated attributes.

FIG. 3 shows an example obtained with use of the method according to the present invention.

In the print shown in FIG. 3, a portion A is a photograph, a portion B is an area to be inverted black to white and vice versa, a portion C is an area to be erased and a remaining portion D is an ordinal character portion.

Figure 4:
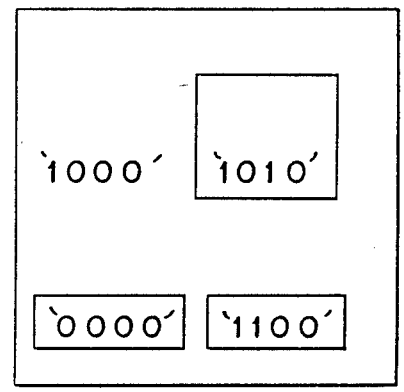
FIG. 4 is an example of attributes designated to obtain the print shown in FIG. 3.

Accordingly, the following attributes are assigned to individual portion A to D, respectively.

portion A . . . half tone processing with the dither pattern 1
portion B . . . inversion of characters
portion C . . . erasing
portion D . . . processing with the fixed threshold value In this case, attribute codes as shown in FIG. 4 are written into respective areas A to D of the attribute RAM 52 in unit of 1×1 mm². Therefore, image data is processed according to the attributes assigned in the attribute RA 52.

(c) Focal distance detection mode

The distance "a" of the light path from the reading position to the focusing lens 8 and the distance "b" of the light path from the focusing lens 8 to the CCD array 9 should satisfy the following optical relations;

$$Ti\ a = f(1 - 1/L.\beta) \quad (1)$$

$$b = f(1 - \beta/L) \quad (2)$$

wherein f is a focal distance of the focusing lens 8, L is a magnification for reading a document and $\beta$ is a reduction ratio of the focusing lens 8 upon reading a document.

Figure 5:
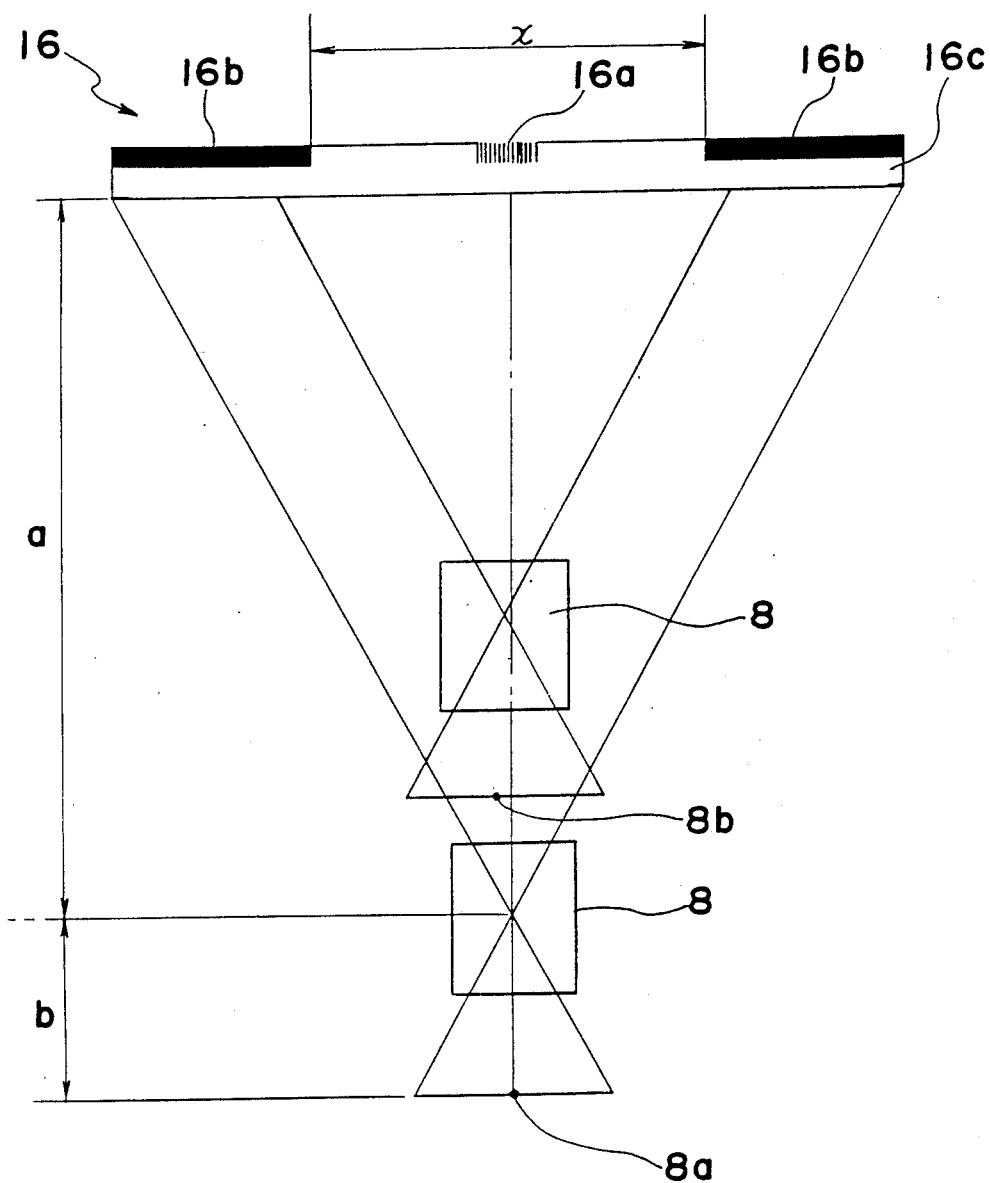
FIG. 5 is a plan view for showing a pattern plate according to the present invention and an optical relation among the pattern plate, a focusing lens and a CCD array according to the present invention.

The focusing state and the magnification are detected with use of a pattern plate 16 as shown in FIG. 5. This pattern plate 16 is attached to the undersurface of a document scaler 15 shown in FIG. 1. The pattern plate 16 has a white background 16c and a stripe pattern 16a in black and white formed at the center portion thereof. Two elongated black patterns 16b are also formed at both sides of the central stripe pattern 16a. The magnification L can be detected by measuring the distance x defined between two black patterns 16b with use of the CCD array 9. The focusing state can be detected by analyzing outputs of the CCD array 9 corresponding to the strip pattern 16a.

Figure 6:
FIG. 6 is an explanative view for showing a manner for detecting the focusing state.
Figure 6:
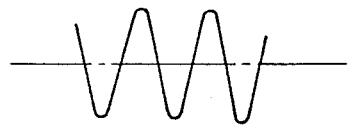
Figure 6:
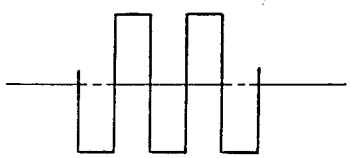

As shown in FIG. 6, the outputs in the out of focus state show a continuous variation, but those in the in-focus state have discrete two levels corresponding to black and white stripes, respectively. Accordingly, the in-focus state is realized by moving the focusing lens 8 so as for the difference between black and white levels to become maximum. The white background 16c of the pattern plate 16 is used for shading correction.

However, the focal distance of the focusing lens 8 includes an error of order of ±0.5% of the nominal focal distance $f_0$ usually. Therefore, it becomes necessary to measure the real focal distance f of the focusing lens 8.

In order for that, the reading magnification and the in-focus state are detected at the equal magnification at first.

Next, the distance "a" between the document and the focusing lens 8 is varied to a distance $a_1$ determined according to the following equation in order to read at a magnification $L_1$;

$$a_1 = f_0(1 - 1/L_1.\beta) \quad (3)$$

Then, the distance "b" between the focusing lens 8 and the CCD array 9 is varied to detect the in-focus state. Thereafter, the distance x between two black patterns 16b is measured by the CCD array 9. The measured distance is set to x'.

The real reading magnification $L_1'$ by the mounted focusing lens 8 is given by an equation $L_1' = x_1'/x$ and satisfies the following equation;

$$f_0(1 - 1/L_1.\beta) = f(1 - 1/L_1'.\beta) \quad (4)$$

The real focal distance f can be obtained from the equation (4) and the distances "a" and "b" can be calculated with use of the real focal distance f. This enables much more accurate setting for the magnification.

It is also possible to detect the real focal distance f with use of the distance "b" between the focusing lens 8 and the CCD array 9. In this case, it is calculated by the following equation;

$$f_0(1-\beta/L_1) = f(1-\beta/L_1') \qquad (5)$$

Figure 8:
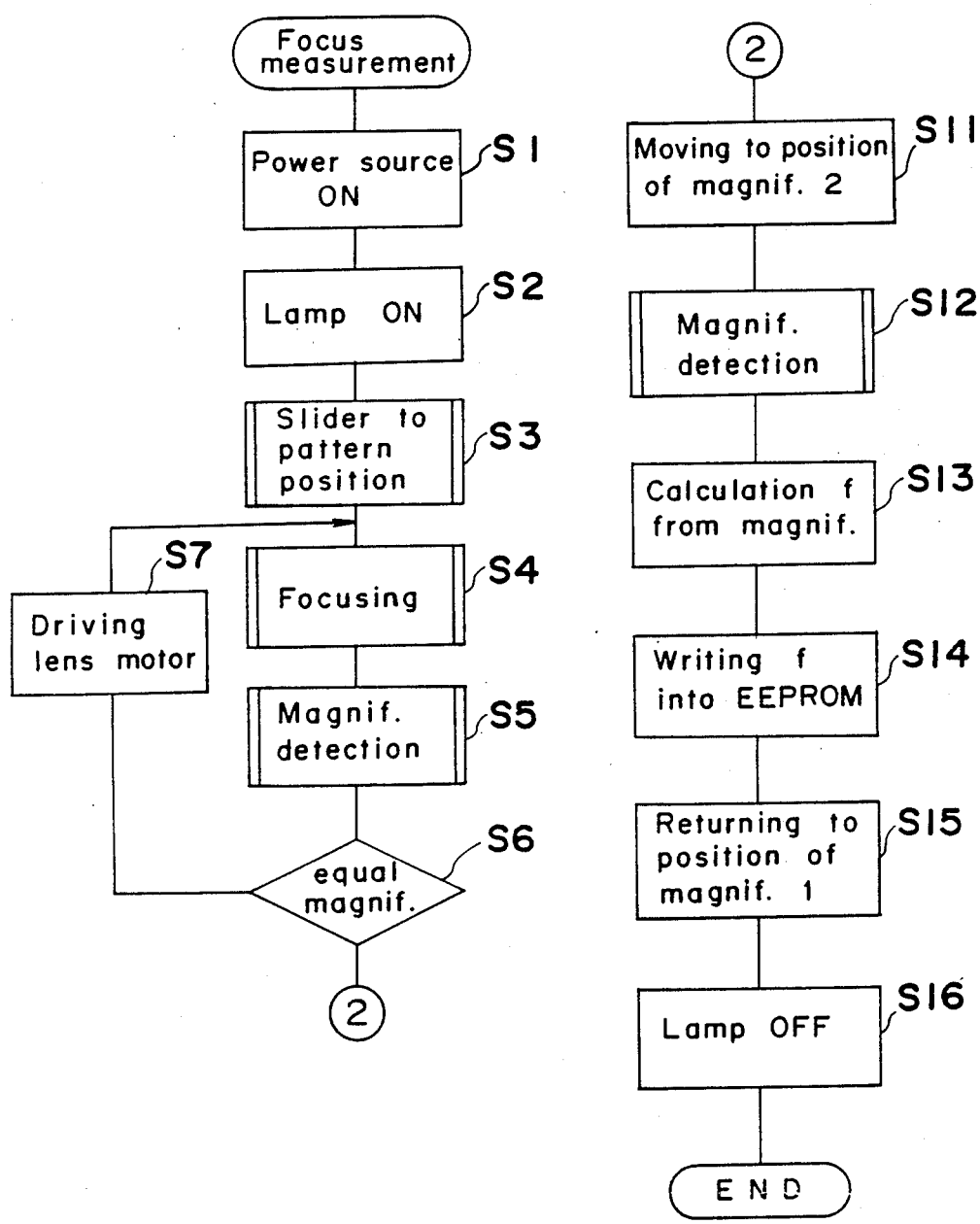
FIG. 8 is a flow chart of a subroutine for measuring the real focal distance of the focusing lens.

When a measurement mode for measuring the focal distance of the focusing lens 8 is designated by operating the dip switch 76 after mounting it into the image reader, the measurement mode is executed according to a flow chart shown in FIG. 8.

When the power source is switched on at step S1, the illumination lamp 1 is turned on at step S2.

Then, the optical scanning system (slider) is moved to a position for illuminating the pattern plate 16 at step S3.

Next, the focusing state is adjusted at step S4 and the magnification is detected at step S5. If the detected magnification is not equal magnification at step S6, the lens motor 12 is driven to rotate in a direction for obtaining the equal magnification at step S7. These steps are repeated until the equal magnification is obtained. When it is detected at step S6, the focusing lens 8 and the CCD array 9 are fixed at their respective in-focus position at the equal magnification.

Next, the focusing lens 8 and the CCD array 9 are moved to respective positions for obtaining a predetermined magnification (equal to "2" in the present embodiment) at step S11.

Each of distances $\Delta a$, $\Delta b$ necessary for moving them to their respective positions is calculated according to each of the following equations with use of the designed focal distance $f_0$ of the focusing lens;

$$\begin{aligned}\Delta a &= f_0(1-1/2\beta) - f_0(1-1/\beta) \\ &= f_0/2\beta\end{aligned} \qquad (6)$$

$$\begin{aligned}\Delta b &= f_0(1-\beta/2) - f_0(1-\beta) \\ &= f_0\beta/2\end{aligned} \qquad (7)$$

Next, the real magnification L' is calculated after adjusting the focusing state at step S12.

And, then, the real distance f of the mounted focusing lens is calculated from the following equation at step S13.

$$f_0\left(1 - \frac{1}{2\beta}\right) = f\left(1 - \frac{1}{L_1'\beta}\right) \qquad (8)$$

The calculated value of the real focal distance f is written into EEPROM 74 at step S14.

Thereafter, respective positions of the focusing lens 8 and the CCD array 9 at the equal magnification are calculated with use of the real focus distance f and both of them are returned to respective calculated positions at step S15. Next, the illumination lamp 1 is turned off at step S16 to complete the focal distance measuring mode.

In the preferred embodiment, the real focal distance f is stored in the EEPROM 74 in unit of 0.001 mm by assigning one word of 16 bits of the EEPROM in order to memorize it. This makes it possible to use a highly accurate focal length and, accordingly, an extremely high resolution of image can be obtained.

In a conventional image reader, the correction data of the focal distance may be input by use of dip switches in a degree of few bits. Accordingly, the corrected focal distance includes an error inevitably which lowers the resolution of image.

Figure 9:
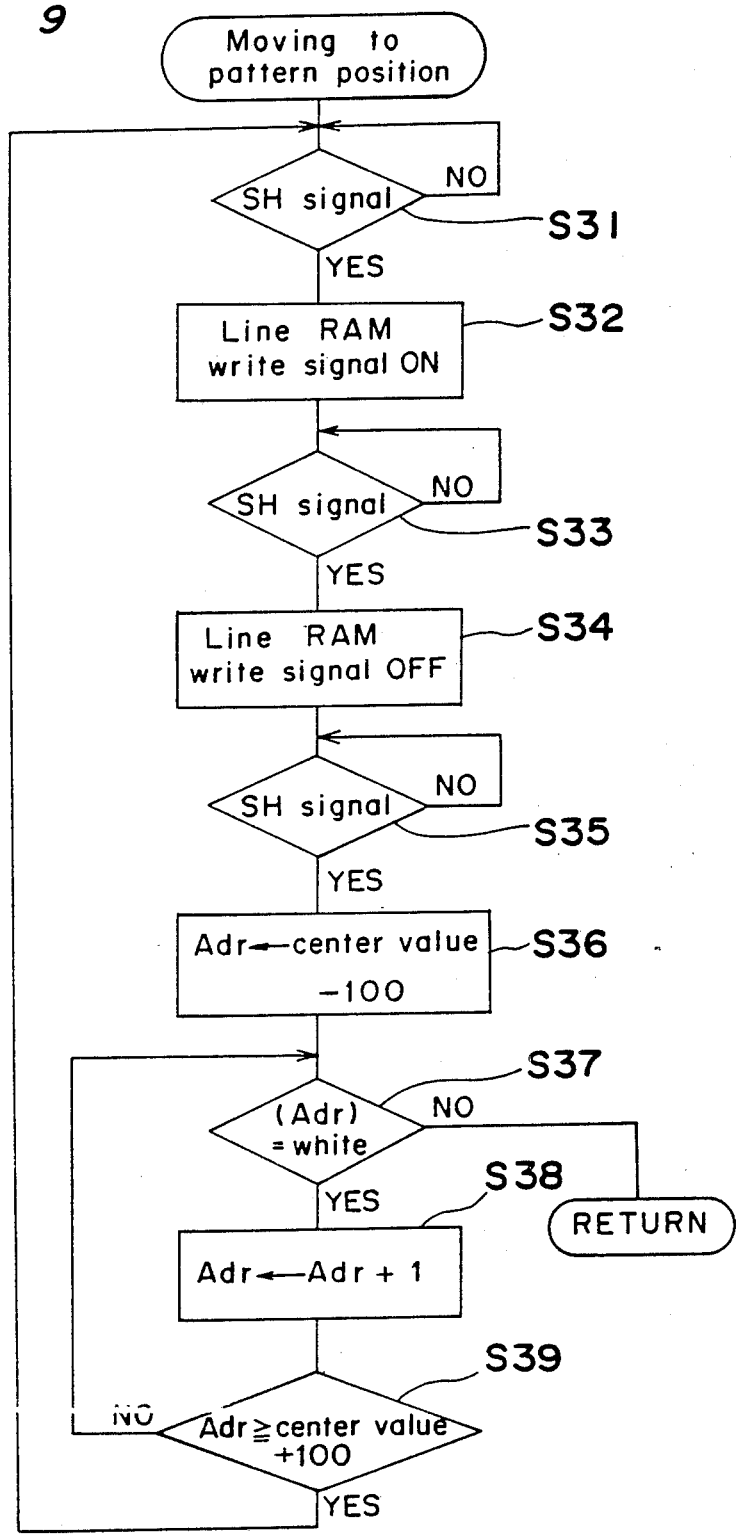
FIG. 9 is a flow chart of a subroutine for moving a scanning optical system (slider) to a position of the pattern plate.

FIG. 9 shows a flow chart of the subroutine S3 of FIG. 8 for moving the slider to a reading position of the pattern plate 16.

At first, it is checked at step S31 whether an SH signal is input to the CCD array 9 and the CPU 42.

The CPU 42 outputs a WRITE signal to the line RAM 50 in synchronous with SH signal to write data into the line RAM 50 at step S32.

If the next SH signal is checked at step S33, the WRITE signal is stopped at step S34.

Next, if another SH signal is detected at step S35, the address Adr of a pointer of the line RAM 50 is set at "the center address −100" at step S36.

If the datum corresponding to the address is white one step at S37, the address Adr is incremented by one at step S38.

If it is detected to be black one at step S37, the process returns to the main flow of FIG. 8 since the reading position is considered to reach to that for reading the central stripe pattern 16a. If any black datum is not detected even when the address Adr is increased to "the center address +100", the process returns to step S31 to repeat those steps mentioned above since it is considered that the optical scanning system does not reach to the stripe pattern 16a.

Figure 10:
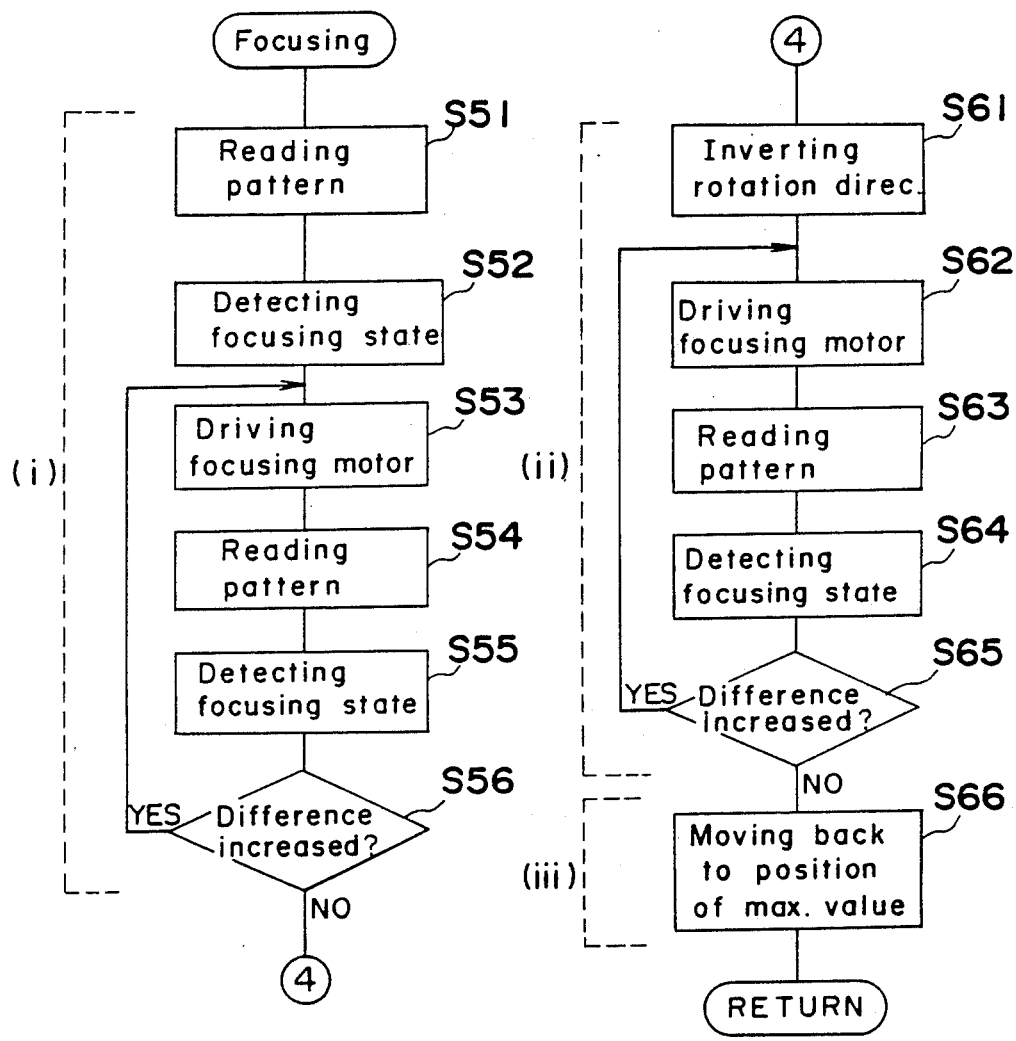
FIG. 10 is a flow chart of a subroutine for adjusting the focusing state.

FIG. 10 shows a flow chart for the focusing subroutine step S4 of FIG. 8.

At first, the stripe pattern 16a is read by the CCD array 9 at step S51. Obtained data is digitalized and corrected by the shading circuit 46 and, then, written into the line RAM 50. At step S52, the difference between black and white levels is calculated from the data stored in the line RAM 50 in order to detect the focusing state at that time.

Next, the focusing motor 13 is driven to rotate in a predetermined direction in order to move the CCD array 9 at step S53. Thereafter, the stripe pattern 16a is read by the CCD array 9 at step S54 and the difference between black and white levels is calculated at step S55. As far as the difference between black and white levels is increased from the latest difference, these steps are repeated since it is considered that the focusing lens has been moved in a correct focusing direction.

If the difference is decreased from the latest difference, the process advances to step S61 in order to reverse the rotational direction of the focusing motor 13 thereat since it means that the focusing motor 13 has been driven in an incorrect direction and, then, the focusing motor is driven to rotate in the reversed direction at step S62. Thereafter, the stripe pattern 16a is read at step S63 and, at step S64, the difference between black and white levels is calculated.

As far as the difference is increased at step S65, those steps are repeated since the focusing lens 8 is moved in the focusing direction.

If the difference is decreased again at step S65, the focusing lens 8 is moved back to the position whereat the difference became the maximum at step S66.

The focusing motor 13 is comprised of a pulse motor in the present embodiment and, therefore, the rotation amount of the focusing motor 13 is given by the number of pulses which is predetermined suitably for detecting the in-focus position.

Figure 7:
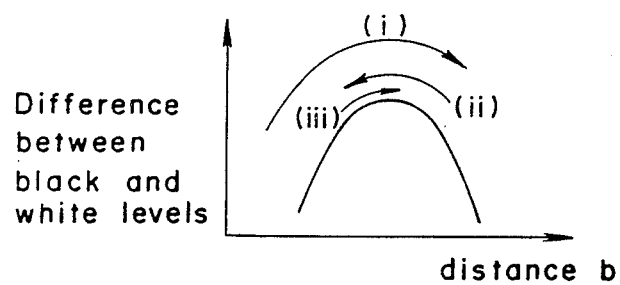
FIGS. 7a and 7b are explanative views for showing a variation of difference between black and white levels when the CCD array is moved relative to the focusing lens.
Figure 7:
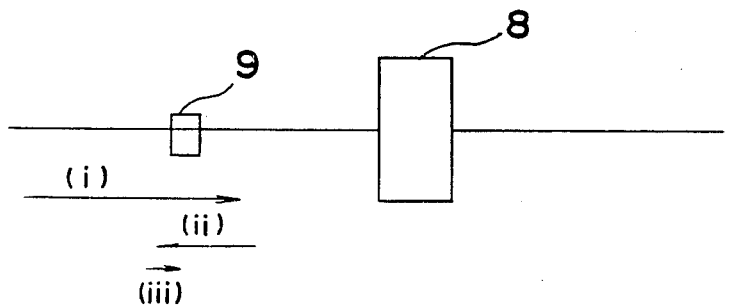

FIG. 7 schematically shows a manner how the difference between black and white levels is varied according to the distance "b" between the focusing lens 8 and the CCD array 9 and the moving direction of the latter.

Figure 11:
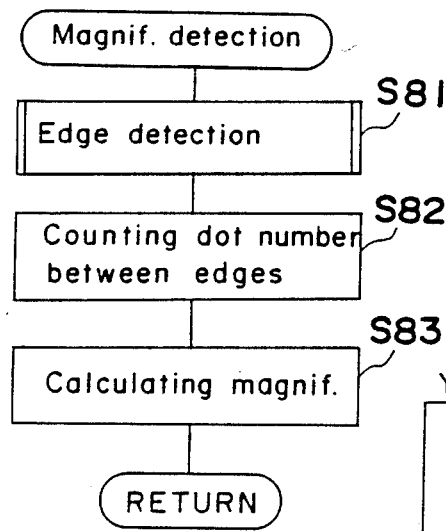
FIG. 11 is a flow chart of a subroutine for detecting the magnification.

FIG. 11 shows a flow chart of the focusing subroutine S5 or S12 of FIG. 8.

At first, inner edges of respective black patterns 16b are detected by the CCD array 9 and addresses thereof are detected at each of which the level is changed from the black level to the white level or vice versa at step S81. Next, the number of dots between detected edges is calculated as the difference between detected addresses at step S82. The magnification is calculated from a ratio of the difference calculated at step S82 to that obtained at the equal magnification at step S83.

In the present preferred embodiment, the distance between edges of the black patterns 16b is set at 140 mm which is equivalent a dot number 2205 at the equal magnification.

Figure 12:
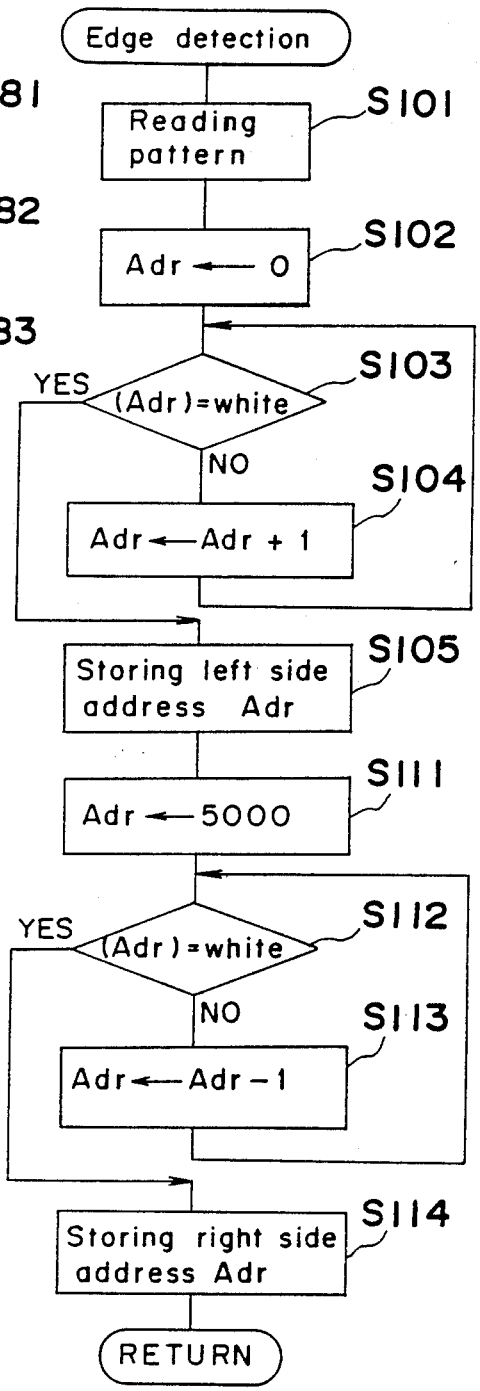
FIG. 12 is a flow chart of a subroutine for detecting pattern edges.

FIG. 12 shows a flow chart of the subroutine S81 of FIG. 11.

At first, the pattern of the pattern plate 16 is read by the CCD array 9 and obtained data is written into the line RAM 50 after digitalizing and performing the shading correction at step S101.

Next, the address Adr of the pointer for reading out data from the line RAM is set at "0" at step S102. It is checked at step S103 whether the data designated by the address of the pointer is white. If it is white at step S103, the address Adr at that time is memorized at step S105 since the address is considered to correspond to the edge of the left side black pattern 16a.

Thereafter, the address pointer is set at, for example, 5,000 at step S111 and is decremented until the data becomes white (at steps S112 and S113).

When the address from which the data becomes white is obtained, it is memorized as an address of the edge of the right black pattern 16b at step S114.

(d) Action in the normal mode

Figure 13:
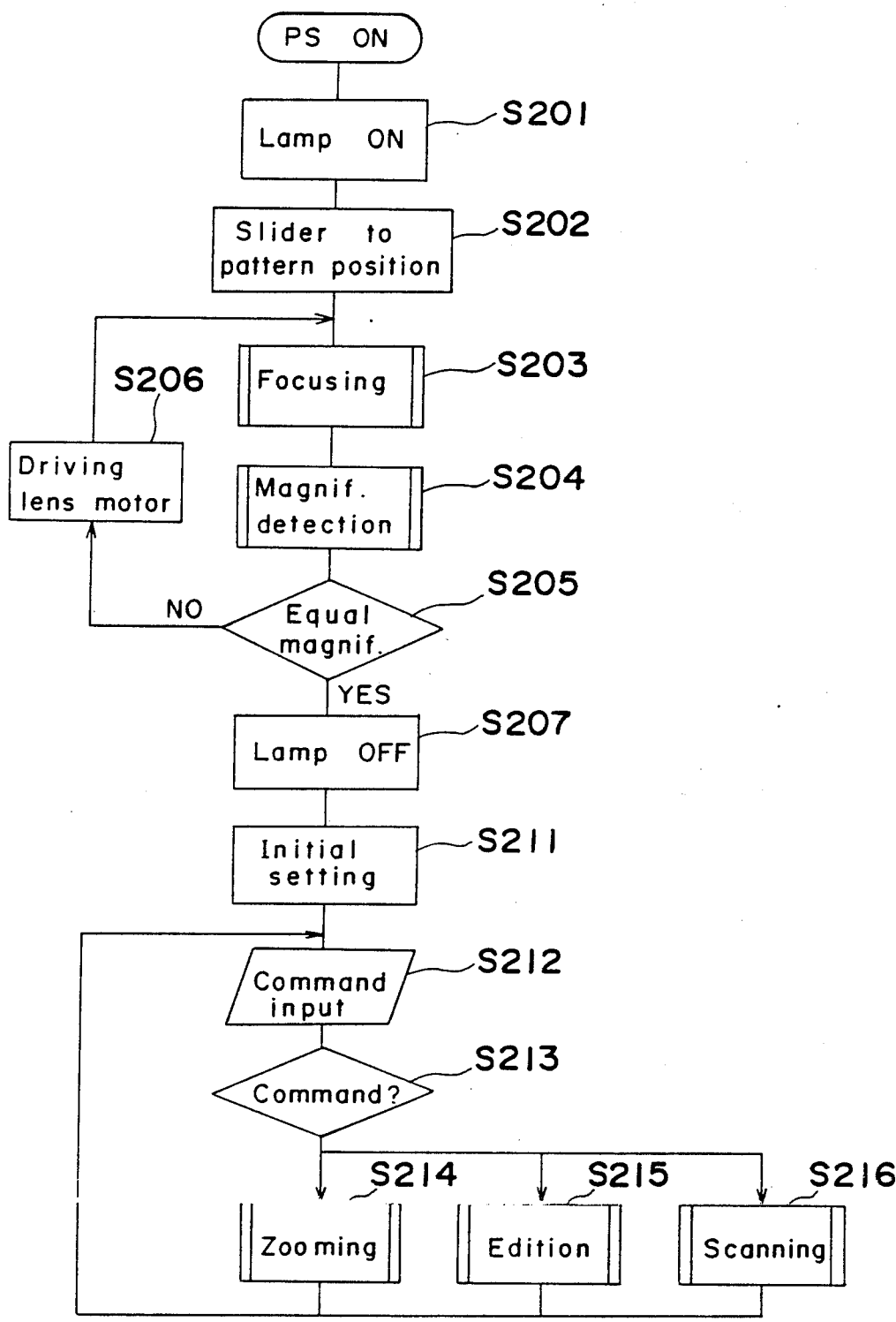
FIG. 13 is a flow chart of the main routine for reading a document.

When the normal mode is designated by the dip switch 76, the following steps are executed according to the flow chart shown in FIG. 13.

When the power source is turned on, the illumination lamp 1 is turned on at step S201, similarly in the focus measuring routine of FIG. 8. Next, the scanning optical system (slider) is moved to the position for illuminating the pattern plate 16 at step S202. Then, the focusing state is adjusted at step S203 and the magnification is detected at step S204.

If the magnification is not the equal magnification at step S205, the lens motor 12 is driven to rotate in the direction toward the equal magnification at step S206. This process is repeated until the equal magnification is detected. Then, the focusing lens 8 and the CCD array 9 are fixed at respective positions when the equal magnification is detected. Thereafter, the illumination lamp is turned off at step S207 and the initial setting is performed at step S211 to wait for a command signal.

Commands for requesting zooming (variation of magnification), edition and scanning are provided. When a command is input at step S212, the process goes to either one of steps S214, S215 and S216 according to the content of the input command at step S213.

At step S214, namely, when the command is a command requesting the variation of magnification, a moving amount and a moving direction are calculated according to the designated magnification and with use of the measured focal distance f read from the EEPROM 74 at step S214.

In the case of the edition requesting command, the content thereof such as masking, trimming, inversion or the like is input into the attribute RAM 52 to execute the edition according to the content at step S215.

If the command is the scanning requesting command, the image reader reads a document at step S216.

Figure 14:
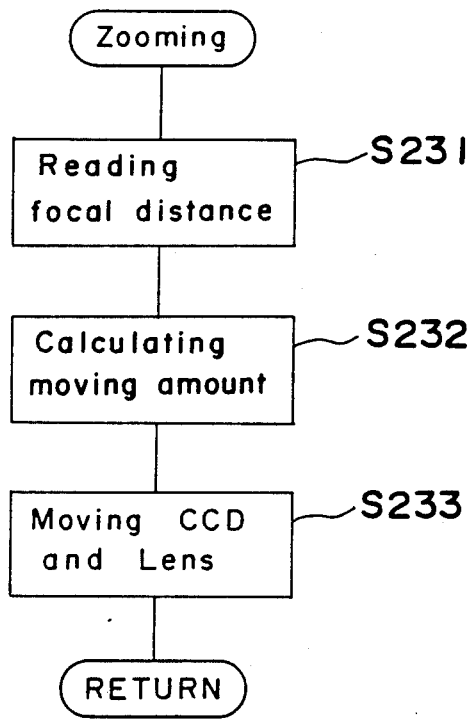
FIG. 14 is a flow chart of the subroutine for varying the magnification shown in FIG. 13.

FIG. 14 shows a flow chart of the subroutine S214 for varying the magnification.

In the case of variation of the magnification, the magnification $L_2$ is designated together with the zooming requesting command.

At first, the focal distance f stored in the EEPROM 74 is read at step S231. Next, moving amounts $\Delta a$ and $\Delta b$ of the focusing lens 8 and the CCD array 9 are calculated according to the following equations at step S232.

$$\Delta a = f\{(1-1/L_2.\beta)-(1-1/L.\beta)\} \quad (9)$$

$$\Delta b = f\{(1-\beta/L_2)-(1-\beta/L)\} \quad (10)$$

wherein L is the present magnification.

Thereafter, the focusing lens 8 and the CCD array 9 are moved by respective moving amounts $\Delta a$ and $\Delta b$ by driving the motors 12 and 13 at step S233, respectively.

Figure 15:
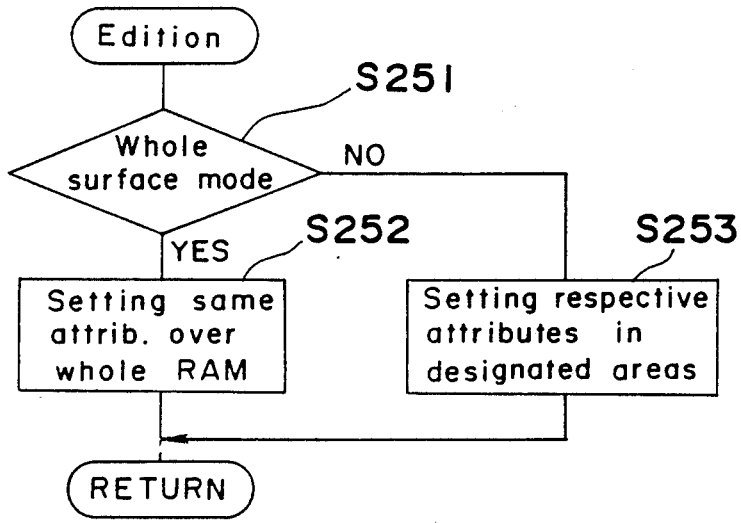
FIG. 15 is a flow chart of the subroutine for edition of image shown in FIG. 13.

FIG. 15 shows a flow chart of the edition subroutine S215 of FIG. 13.

Whole area mode and limited rectangular area mode are provided as edition commands.

At first, it is checked whether the command is the whole area mode or not (at step S251).

If it is the whole area mode, the same attribute such as half-tone is set over the whole area of the attribute RAM 52 at step S252. If it is not, the designated attribute such as trimming, masking etc. is written into the area designated by two coordinate points and different processings are executed inside of the designated area and outside thereof at step S253.

Figure 16:
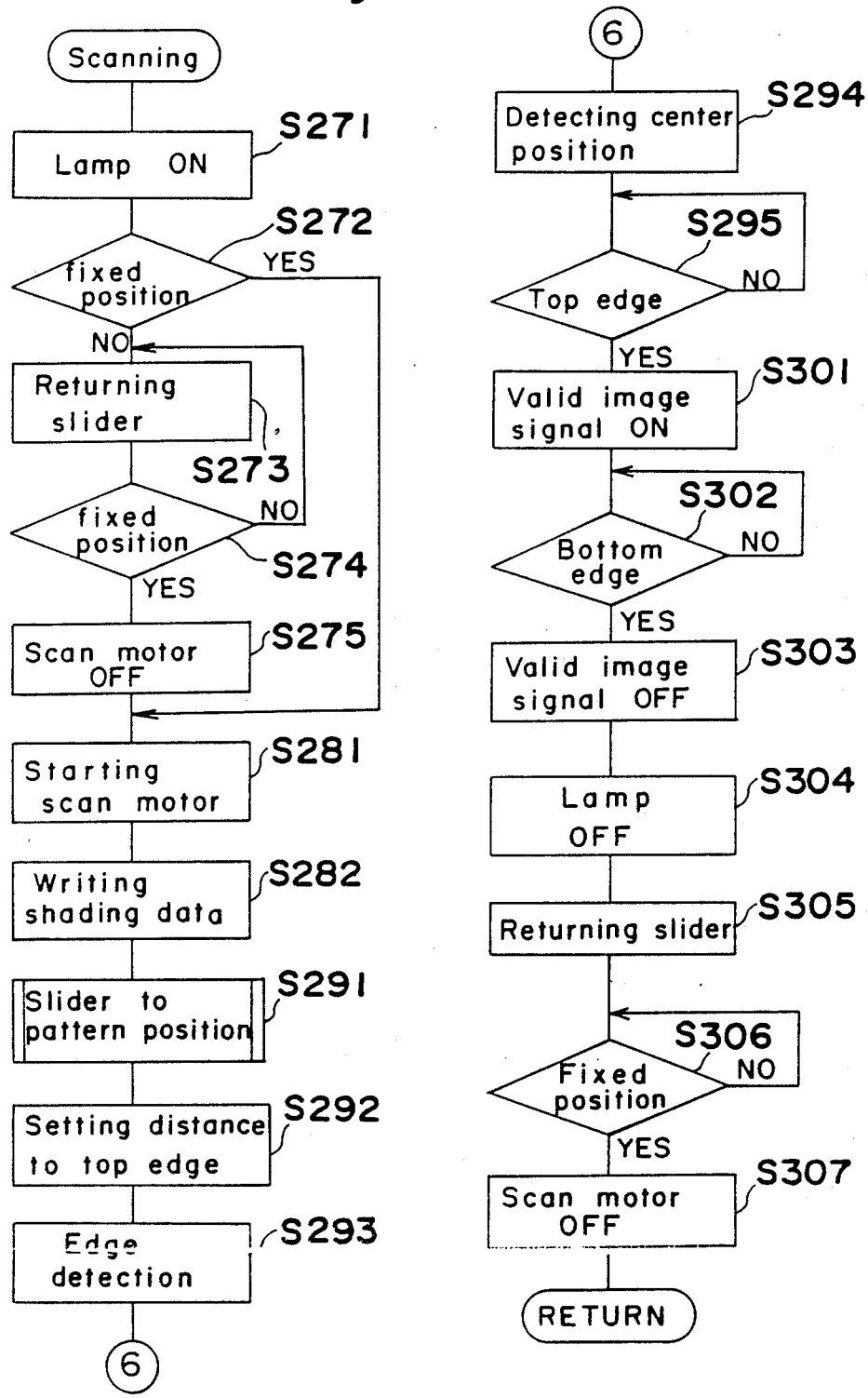
FIG. 16 is a flow chart of the subroutine for scanning a document shown in FIG. 13.

FIG. 16 shows a flow chart of the scanning subroutine S216 of FIG. 13.

At first, the illumination lamp 1 is turned on at step S271 and it is checked at step S272 whether the scanning optical system is located at the fixed position or not. If the fixed position switch (not shown) is switched on at step S274, the scanning motor is turned off at step S275. If it is not switched on at step S275, the scanning optical system is further moved until it reaches to the fixed position (at steps S273 and S275).

Then, at step S281, the scanning motor is driven to move the scanning optical system to the position of the white background 16c of the pattern plate 16 in order for the shading correction of the output of the CCD array 9 by the shading circuit 46 after digitalizing the output data. The shading data is stored into a shading RAM (not shown) provided in the shading circuit 46 at step S282. The latter corrects the digitalized image data according to the content stored in the shading RAM and outputs the corrected image data therefrom.

Next, the scanning optical system is moved to the position of patterns 16a and 16b on the pattern plate 16 (see step S291 of FIG. 13). Since a distance from the pattern position to the top edge of a document defined on the document glass platen is known, a value of the distance is set as a moving amount of the scanning optical system at step S292.

Next, both of inner edges of the black patterns 16b and 16b are detected at step S293. The center address is calculated with use of addresses of the both edges at step S294. This step S294 is executed in order to compensate a possible shift of the center position for reading which may be caused when the focusing lens is moved to a position corresponding t the designated magnification as indicated by two center positions 8a and 8b in FIG. 5. This center address is used as the reference address for aligning each line of valid image data upon outputting it. This enables to coincide respective center positions of document images with each other upon printing them at an arbitrary magnification.

Next, the scanning optical system is moved to the position corresponding to the top edge of a document by driving the scanning motor at step S295. The distance to be moved is already known and, therefore, the scan can be started exactly therefrom even after varying the magnification.

When the scanning optical system is moved to the top edge of a document, the valid image signal is made "high" to start the reading of a document image by the CCD array 9 at step S301.

When the scanning optical system reaches to the position of the bottom end of a document at step S302, the valid image signal is made "low" to complete the reading of a document image at step S303. Thereafter, the illumination lamp 1 is turned off at step S304 and the scanning optical system is returned to the fixed position at steps S305 and S306. Then, the scanning motor is stopped at step S307.

In the present preferred embodiment, the center address is detected during the scan. However, it is possible to detect the center address by moving the scanning optical system to the pattern position before starting the scan.

Further, since the center position is not shifted if the magnification is not varied, the detection of the center position can be performed only when the magnification is varied.

The preferred embodiments described herein are illustrative and not restrictive, the scope of the invention being indicated by the appended claims and all variations which come within the meanings of the claims are intended to be embraced herein.

What is claimed is:

1. An image reader, comprising:
a scanning optical means for scanning an image of a document with a slit;
an image sensor and a projection lens for projecting the scanned image onto the image sensor wherein the image sensor and the projection lens are movable on the optical axis of the latter relative to each other in order to vary the magnification for projecting the document image onto the image sensor;
a platen glass plate on which the document is to be put;
a pattern element having two black or white patterns for defining respective edges, said pattern element being arranged near the top portion of the platen glass plate;
determining means for determining a real focal distance of said projection lens, said determining means positioning said scanning optical means so as to project the image of said patterns on said image sensor, positioning said projection lens and said image sensor at specific positions corresponding to a predetermined magnification, measuring a distance between two edges of said patterns on the basis of outputs from said image sensor and calculating the real focal distance on the basis of the measured distance;
memory means for storing the real focal distance determined by said determining means; and
positioning means for positioning said image sensor and the projection lens at respective positions calculated from the magnification designated for reading the image of a document and the real focal distance read from said memory means.

2. An image reader as claimed in claim 1, in which said determining means determines the real focal distance according to the following equation:

$$f_0\left(1 - \frac{1}{L_1 \beta}\right) = f\left(1 - \frac{1}{L_1' \beta}\right)$$

wherein
$f_0$: nominal focus distance of said projection lens;
$f$: real focal distance of said projection lens;
$L_1$: predetermined magnification;
$L_1'$: a magnification calculated from the measured distance between the two edges;
$\beta$: predetermined reduction ratio of said projection lens for reading a document.

3. An image reader as claimed in claim 1, in which said determining means determines the real focal distance according to the following equation:

$$f_0\left(1 - \frac{\beta}{L_1}\right) = f\left(1 - \frac{\beta}{L_1'}\right)$$

wherein
$f_0$: nominal focal distance of said projection lens;
$f$: real focal distance of said projection lens;
$L_1$: predetermined magnification;
$L_1'$: a magnification calculated from the measured distance between the two edges;
$\beta$: predetermined reduction ratio of said projection lens for reading a document.

4. An image reader, comprising:
an image sensor;
a projection lens for projecting an image of a document onto the image sensor;
moving means for moving said image sensor and said projection lens along the optical axis of the projection lens in order to vary a magnification;
a pattern element having two black or white patterns for defining respective edges, said pattern element being provided in the vicinity of a plane on which the document is to be placed;
first control means for controlling said moving means to locate said image sensor and said projection lens at respective predetermined positions corresponding to a predetermined magnification;
means for causing the projection of the image of said patterns on said image sensor with said image sensor and said projection lens both located at the respective predetermined positions;
measuring means for measuring a distance between two edges of said patterns on the basis of outputs from said image sensor;
first calculating means for calculating the real focal distance of the projection lens on the basis of the distance measured by said measuring means;
memory means for storing the real focal distance calculated by said calculating means;
second calculating means for calculating respective positions corresponding to a desired magnification according to the real focus distance stored in said memory means; and second control means for controlling said moving means to locate said image sensor and said projection lens at the respective positions corresponding to said desired magnification.

5. An image reader as claimed in claim 4, in which said determining means determines the real focal distance according to the following equation:

$$f_0\left(1 - \frac{1}{L_1\beta}\right) = f\left(1 - \frac{1}{L_1'\beta}\right)$$

wherein
- $f_0$: nominal focal distance of said projection lens;
- $f$: real focal distance of said projection lens;
- $L_1$: predetermined magnification;
- $L_1'$: a magnification calculated from the measured distance between the two edges;
- $\beta$: predetermined reduction ratio of said projection lens for reading a document.

6. An image reader as claimed in claim 4, in which said determining means determines the real focal distance according to the following equation:

$$f_0\left(1 - \frac{\beta}{L_1}\right) = f\left(1 - \frac{\beta}{L_1'}\right)$$

wherein
- $f_0$: nominal focal distance of said projection lens;
- $f$: real focal distance of said projection lens;
- $L_1$: predetermined magnification;
- $L_1'$: a magnification calculated from the measured distance between the two edges;
- $\beta$: predetermined reduction ratio of said projection lens for reading a document.

7. A method of positioning an image sensor and a projection lens for projecting an image onto the image sensor in order to obtain a desired magnification in an image reader, said method comprising the steps of:

providing a pattern element having two black or white patterns for defining respective edges in the vicinity of a plane on which the document is to be placed;

positioning the image sensor and the projection lens at specific positions corresponding to a predetermined magnification;

projecting the image of said patterns on the image sensor at the specific position;

measuring a distance between two edges of said patterns on the basis of outputs from said image sensor;

calculating a real focal distance of the projection lens on the basis of the measured distance;

storing the real focal distance calculated; and calculating respective positions of the image sensor and the projection lens in order to obtain a desired magnification on the basis of the real focus distance stored; and positioning the image sensor and the projection lens at the respective positions calculated.

* * * * *